US008896228B2

(12) United States Patent
Harrington et al.

(10) Patent No.: US 8,896,228 B2
(45) Date of Patent: *Nov. 25, 2014

(54) LIGHT EMITTING DIODE CIRCUITS FOR GENERAL LIGHTING

(71) Applicant: RTC Inc., Dexter, MI (US)

(72) Inventors: Richard H. Harrington, Dexter, MI (US); Charles W. Krapf, Livonia, MI (US)

(73) Assignee: RTC Inc., Dexter, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,982

(22) Filed: Mar. 13, 2013

(65) Prior Publication Data

US 2013/0193861 A1      Aug. 1, 2013

Related U.S. Application Data

(63) Continuation-in-part of application No. 13/454,473, filed on Apr. 24, 2012, now abandoned, which is a continuation of application No. 12/150,256, filed on Apr. 25, 2008, now Pat. No. 8,164,273.

(60) Provisional application No. 60/926,450, filed on Apr. 27, 2007.

(51) Int. Cl.
*H05B 37/02* (2006.01)
*H05B 33/08* (2006.01)

(52) U.S. Cl.
CPC ........ *H05B 33/0833* (2013.01); *H05B 33/0809* (2013.01); *H05B 33/0827* (2013.01); *Y02B 20/341* (2013.01)
USPC ............ 315/291; 315/250; 315/294; 315/307

(58) Field of Classification Search
CPC ............... H05B 33/08; H05B 33/0815; H05B 33/0827; H05B 37/02; H05B 37/0227; H05B 37/029
USPC ......... 315/149–158, 250, 291, 294, 297, 307, 315/308
See application file for complete search history.

(56) References Cited

U.S. PATENT DOCUMENTS

| | | |
|---|---|---|
| 5,575,459 A | 11/1996 | Anderson |
| 5,676,548 A | 10/1997 | McAlpin et al. |
| 6,285,140 B1 | 9/2001 | Ruxton |
| 6,528,954 B1 | 3/2003 | Lys et al. |
| 7,071,633 B2 | 7/2006 | Gallagher et al. |
| 7,271,802 B2 | 9/2007 | Wang et al. |

(Continued)

*Primary Examiner* — Tung X Le
(74) *Attorney, Agent, or Firm* — Gifford, Krass, Sprinkle, Anderson & Citkowski, P.C.

(57) ABSTRACT

Improved circuits minimize, or eliminate, energy losses in the supply of energy to control LEDs. Diodes and a capacitor reduce or eliminate LED blinking, and create smooth and continuous, infinitely variable dimming. The components are added to supply power to each LED during the half of the AC cycle where it would normally be turned off. A first added diode allows an added capacitor to charge during the half cycle that the original diode is turned on, but does not allow the other half cycle to discharge the added capacitor. When the added capacitor is charged enough to turn on the original diode, it stays on throughout the AC cycle. The same relationship exists between the second added diode, the added capacitor and the second original diode. Zener diodes protect the LEDs from voltage surges/spikes by shunting current around LEDs when the voltage exceeds the Zener diode's breakdown voltage.

6 Claims, 22 Drawing Sheets

(56) References Cited

U.S. PATENT DOCUMENTS

| | | | |
|---|---|---|---|
| 7,615,939 B2 * | 11/2009 | Halter | 315/307 |
| 7,830,095 B2 | 11/2010 | Erhardt | |
| 7,872,423 B2 | 1/2011 | Biery et al. | |
| 2002/0171379 A1 | 11/2002 | Adamson | |
| 2004/0135565 A1 | 7/2004 | Douma et al. | |
| 2005/0219060 A1 | 10/2005 | Curran et al. | |
| 2006/0043904 A1 | 3/2006 | De Anna et al. | |
| 2006/0119292 A1 | 6/2006 | Black et al. | |
| 2008/0157686 A1 | 7/2008 | Chung et al. | |
| 2008/0191631 A1 | 8/2008 | Archenhold et al. | |
| 2008/0252229 A1 * | 10/2008 | Wu | 315/227 R |
| 2011/0187276 A1 | 8/2011 | Shteynberg et al. | |

* cited by examiner

Current Probe Properties
Ratio of Voltage to Current    1    V/mA
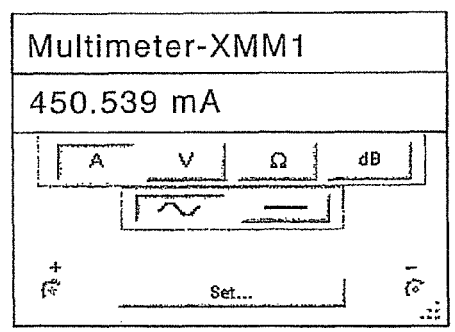
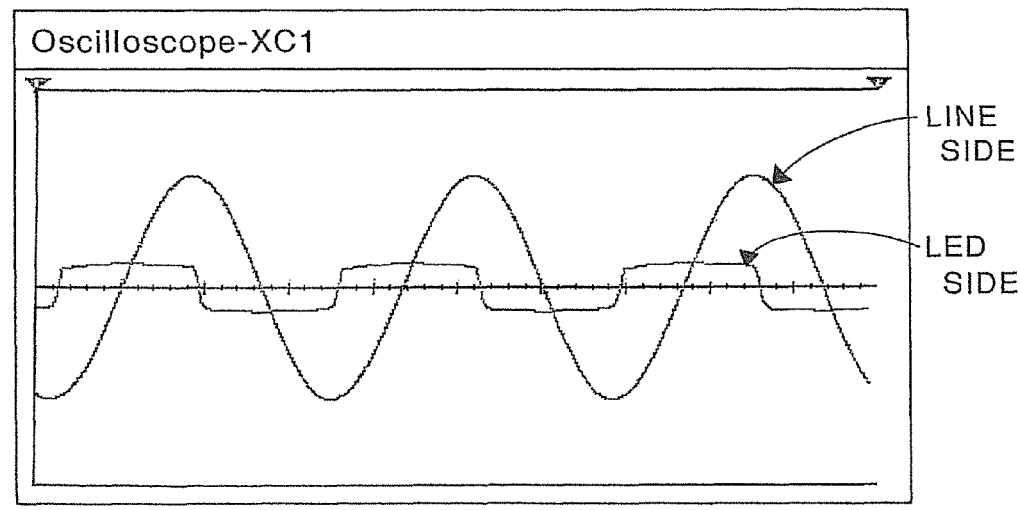
FIG 6

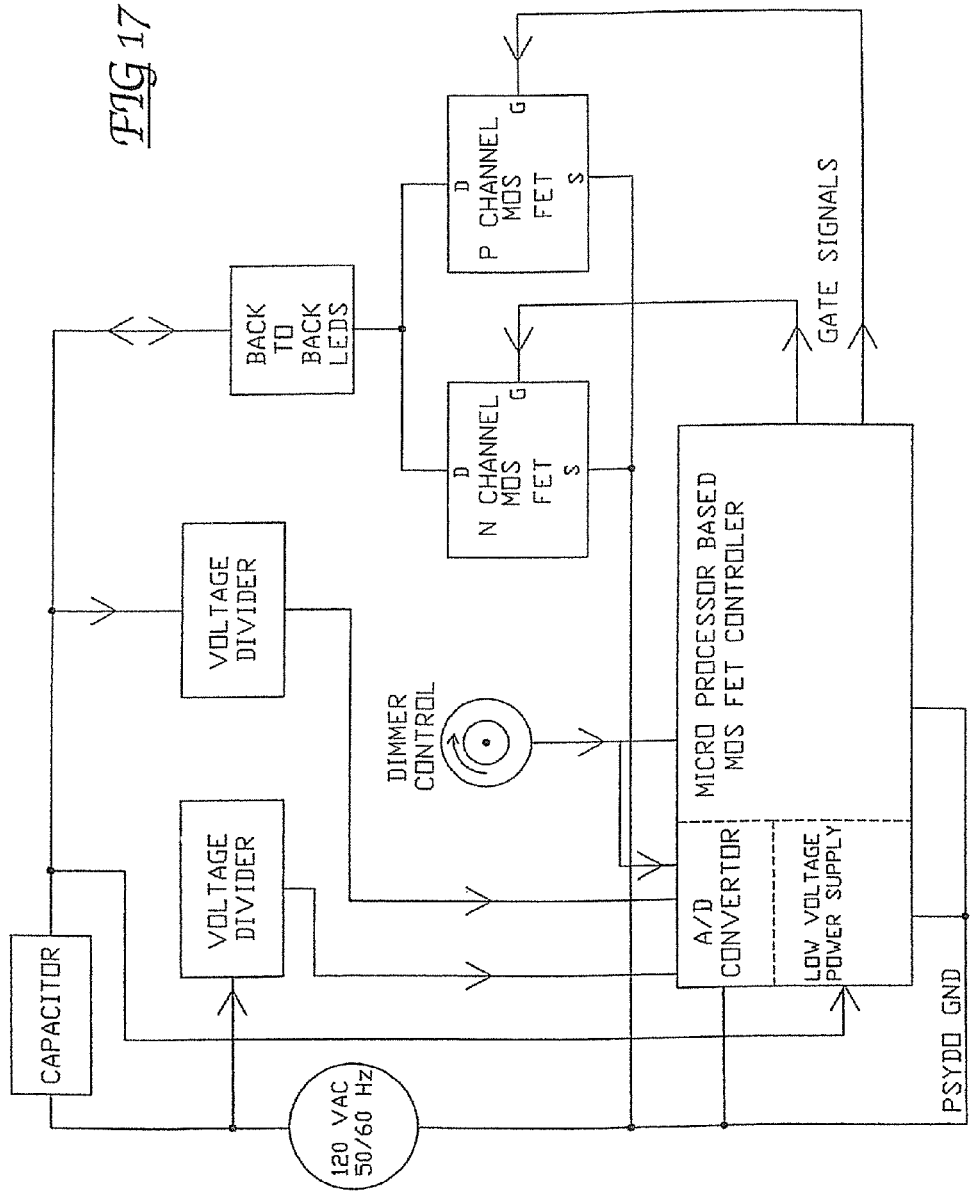

LIGHT EMITTING DIODE CIRCUITS FOR GENERAL LIGHTING

REFERENCE TO RELATED APPLICATIONS

This application is a continuation-in-part of U.S. patent application Ser. No. 13/454,473, filed Apr. 24, 2012, which is a continuation of U.S. patent application Ser. No. 12/150,256, filed Apr. 25, 2008, now U.S. Pat. No. 8,164,273, which claims priority to U.S. Provisional Patent Application Ser. No. 60/926,450, filed Apr. 27, 2007. The entire content of each application is incorporated herein by reference.

FIELD OF THE INVENTION

This invention relates generally to improvements in electronic control for light-emitting diodes (LEDs) and, in particular, to highly efficient circuits that minimize, if not substantially eliminate, energy losses in the supply of energy to and control of LEDs.

BACKGROUND OF THE INVENTION

LEDs are semiconductor devices that produce light when a current is supplied to them. "White" light emitting diodes (LEDs) are LEDs that emit a full visual spectrum of light. Such LEDs took a considerable number of years to be developed and considerably more years to be brought to mass production. In particular, only recently have white LEDs with lumen outputs sufficient for general lighting and therefore replacement of incandescent or fluorescent lighting become available. White LEDs offer a very real reduction in energy cost in comparison with incandescent and fluorescent lights but also operate with a much lower temperature rise.

Unfortunately, because white LEDs operate at a few volts and general lighting operates at 110 volts AC RMS or 220 volts AC RMS, either strings of white LEDs in series or extensive and complicated passive (and sometimes active) electric circuit elements are employed to avoid the application of over voltages to the white LEDs. Blinking from power transient can be a problem. Another problem is that conventional (TRIAC) operated dimmers require the light to be turned on and then turned back down to a lesser brightness. What was needed was a smooth and continuous variable dimming of LEDs.

SUMMARY OF THE INVENTION

This invention resides in improvements in electronic control circuits for light-emitting diodes (LEDs) that minimize, if not substantially eliminate, energy losses in the supply of energy to and control of LEDs.

In accordance with one embodiment, electrical apparatus for controlling back-to-back LEDs powered by an alternating current (AC) line voltage includes a pair of electrically controlled switches connected in parallel with one another, and with the switches in parallel being connected in series with the LEDs. A voltage divider outputs a signal representative of the AC line voltage, and an electrical component having a value provides a signal that determines the brightness of the LEDs through a range of brightness levels up to a maximum brightness level. A control circuit in electrical communication with the voltage divider, the electrically controlled switches, and the electrical component, is operative to independently control the electrically controlled switches to adjust the brightness level of the LEDs as a function of the signals received from the voltage divider and the electrical component. The value of the electrical component is intentionally selected to produce an LED brightness level below the maximum brightness level, such that the light produced by the LEDs is substantially constant over a wide range of AC line voltages.

In the embodiment just described, the electrical component may be a resistance, and the electrical signal that determines the brightness of the LEDs is a voltage. Two values of the electrical component may be selected to simulate the operation of a conventional 3-way incandescent light bulb. Alternatively, the electrical component may be a variable resistance, set a position to produce an LED brightness level that is less than the maximum brightness level.

Electrical apparatus according to the invention for controlling light-emitting diodes (LEDs) powered by an alternating current (AC) line with positive and negative half cycles occurring at alternating zero-crossing points includes at least one set of LEDs connected in a back-to-back configuration. A dimmer control enables a user to adjust the light produced by the LEDs to a desired brightness level. A pair of electrically controlled switches are connected in parallel with one another, with the switches in parallel being connected in series with the LEDs. A capacitor supplies power to the LEDs, the capacitor, the LEDs, and the switches being connected in series with the AC line. A processor is operative to turn ON one of the electrically controlled switches and a subset of the LEDs for each half cycle of the AC line when each zero crossing point is detected. A differential amplifier outputs a signal representative of the instantaneous voltage across the capacitor following each zero-crossing point.

The processor is further operative to determine a maximum voltage value across the capacitor associated with the desired brightness level set by the user control. A comparator is operative to compare the instantaneous voltage across the capacitor and the maximum voltage value across the capacitor and interrupt the processor causing the processor to turn OFF the electrically controlled switch and the subset of LEDs until the following half cycle to reduce blinking.

Alternative electrical apparatus for controlling light-emitting diodes (LEDs) powered by an alternating current (AC) line with positive and negative half cycles occurring at alternating zero-crossing points includes at least one set of LEDs connected in a back-to-back configuration. A dimmer control enables a user to adjust the light produced by the LEDs to a desired brightness level. An-channel MOSFET and a p-channel MOSFET are connected in parallel with one another, and with the MOSFETs in parallel being connected in series with the LEDs. A capacitor supplies power to the LEDs, the capacitor, the LEDs, and the MOSFETs being connected in series with the AC line. processor being operative to perform the following functions:

a) turn ON the n-channel MOSFET and a subset of the LEDs for each positive half cycle of the AC line when each zero crossing point is detected prior to the onset of each positive half cycle, and b) turn ON the p-channel MOSFET and a different subset of the LEDs for each negative half cycle of the AC line when each zero crossing point is detected prior to the onset of each negative half cycle.

A differential amplifier outputs a signal representative of the instantaneous voltage across the capacitor following each zero-crossing point. The processor is further operative to determine a maximum voltage value across the capacitor associated with the desired brightness level set by the user control. A comparator is operative to compare the instantaneous voltage across the capacitor and the maximum voltage value across the capacitor, and interrupt the processor, causing the processor to turn OFF each MOSFET and the subset of LEDs controlled by each MOSFET until the following half cycle to reduce blinking.

For a more complete understanding of the present invention, reference is made to the following detailed description when read with in conjunction with the accompanying drawings wherein like reference characters refer to like elements throughout the several views, in which:

BRIEF DESCRIPTION OF THE DRAWINGS

FIG. 6 illustrates voltage vs. time for Capacitor C1 in the circuit of FIG. 1;
FIG. 15b illustrates the Zener circuit for the light array of FIG. 15a;
FIG. 16a illustrates a simple circuit for a three-stage LED light dimmer circuit;
FIG. 16b illustrates a truth table for the LED light dimmer of FIG. 16a;
FIG. 17 illustrates a block diagram for a substantially infinitely variable LED light dimmer;
FIG. 21 are diagrams that show how the circuit of FIG. 17 may be used to achieve line-voltage-insensitive LED operation (i.e., "brownout-proof operation)

DETAILED DESCRIPTION OF THE INVENTION

Figure 1:
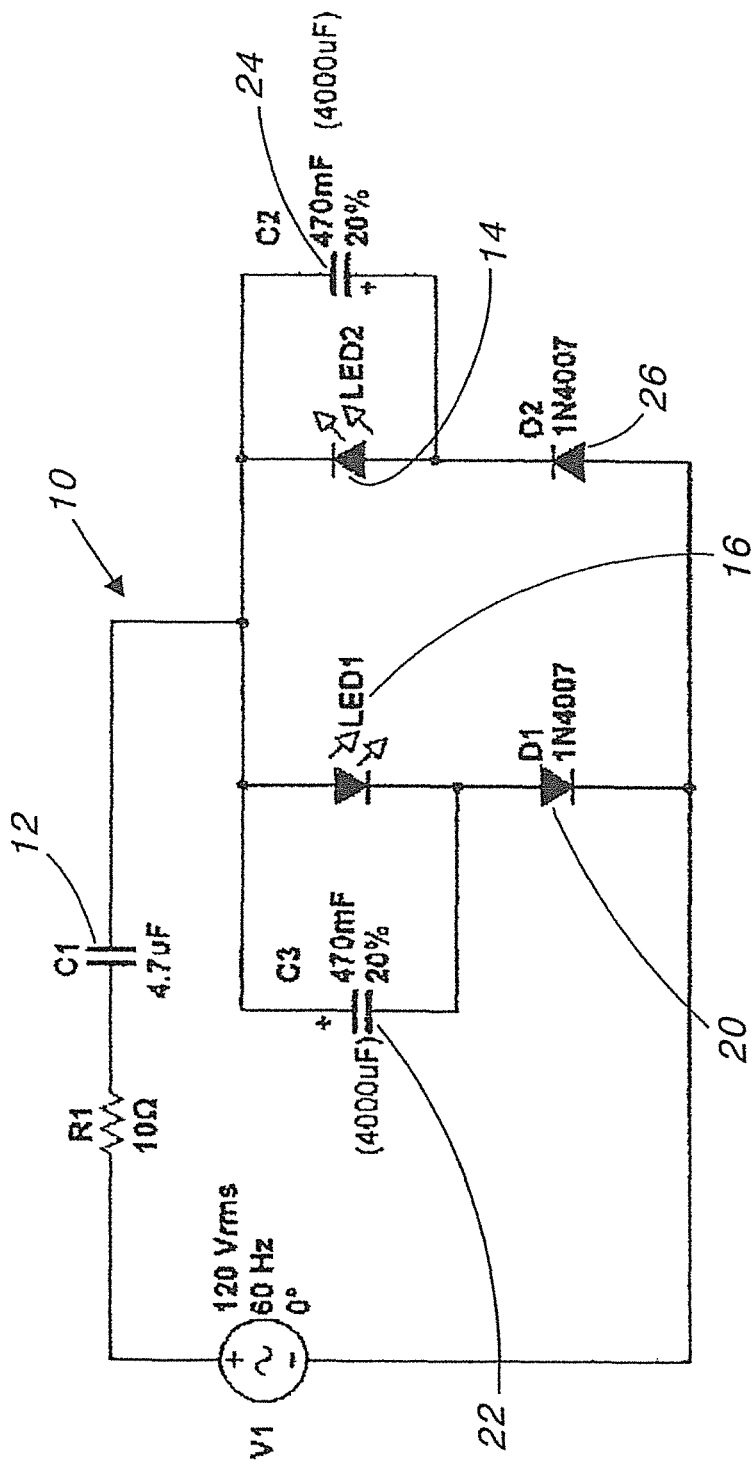
FIG. 1 illustrates a circuit to control LED blinking.

The invention comprises improved electric circuits that are highly efficient and minimize, if not substantially eliminate energy losses in the supply of energy to and control of LEDs. Applicable LEDs include prototype power line LEDs such as the OPTEK OVSPW7CRB with a custom heat sink rated at 350 mA continuous.

The addition of two diodes and two capacitors arranged into a circuit (FIG. 1) increases efficiency and can reduce or eliminate LED blinking. These components are designed into the circuit to supply power to each LED during the half of the AC cycle where it would normally be turned off. A first added diode allows a first added capacitor to charge during the half cycle that the original diode is turned on, but does not allow the other half cycle to discharge the added capacitor. When the added capacitor is charged enough to turn on the original diode, it stays on throughout the AC cycle. The same relationship exists between the second added diode, the second added capacitor and the second original diode.

The larger the added capacitor, the less variation there is in LED brightness, but the longer it takes for the LED to turn on initially. Filter capacitor in the circuit when simulated must be pretty large (4000 uF) and 160 mS is needed to turn on. Both LEDs stay on all the time but vary in brightness. Larger capacitors reduce flicker farther but take longer to turn on. Voltage on one of the filter capacitors increases with each AC cycle until the voltage reaches the operating voltage of the LED.

N channel and P channel Low Loss MOSFETs are used for the circuit (FIG. 8) to replace a small resistor in series with the Anode to Cathode connected LEDs. The purpose of the MOSFET's is to reduce the power dissipated in the resistor. Some form of current limiting is necessary during the switch activation which if not done at the Zero Crossing of the applied AC Waveform, will cause huge current spikes in the LEDs causing then to open up (catastrophic failure). Using a resistor in series with the LEDs will work, but will cause power to be wasted and cause the resistor to get hot. In the circuit, the power is applied to the capacitor when the power switch is turned on. Initially, the MOSFETs are turned off, and only leakage current flows through the LEDs (a few uA or less). When power is applied to the circuit, the rectifier passes the current to the Time Delay circuit if the voltage is such that the rectifier is forward biased. The Time Delay circuit will after some time turn on the MOSFET's so that current can flow through the CAPACITOR/LED circuit. The Time Delay is such that the transient of the switch closing is not seen, and the NMOSFETs are turned on in a gradual fashion.

The circuit also employs two Zener diodes connected in series with their cathodes tied together. With this configuration, the max Voltage drop is equal to the Zener voltage plus the forward drop of one Zener diode. The two Zener diodes are then connected in parallel with the Anode to Cathode LED package so that if one LED opens up, the entire string does not go out (Christmas Tree Light Syndrome). The voltage drop across the series Zener diodes is chosen to be slightly greater than the voltage across the Back to Back LEDs. The Zener diodes protect the LEDs from voltage surges/spikes by shunting current around LEDs when the voltage exceeds the Zener diode's breakdown voltage. Advantages of the new designs include the following:

1. This new Light Emitting Diode (LED) Dimmer is totally different from conventional TRIAC operated dimmers. This new dimmer is very energy efficient and also will work at all dimmer settings of the incoming AC line voltage. This makes it possible to operate at light levels that are just visible, and the diodes not have the annoying sudden "lights On" when turning the control from OFF to some ON level. This dimmer will instead turn the LEDs on very gradually.

2. In a block diagram of the new LED dimmer circuit (FIG. 17), the 120VAC connects directly to a Capacitor that supplies power to three blocks. The first block is the LOW VOLTAGE POWER SUPPLY that generates low voltage DC for use by the Micro Processor based MOSFET Controller. The second and third blocks are voltage dividers that divide the voltages by using two resistors so that the voltage going into the A/D Converter is within the operating range of the A/D. The two voltages are: the Capacitor input voltage (Line Voltage), and the second is the Capacitor output voltage.

3. The fourth block (discussed below) is the Back to Back LEDs. The reason that the LEDs are connected Anode to Cathode (Back to Back) is so the Capacitor can have a conduction path for both polarities of the incoming AC power. The Capacitor supplies all the current for the LEDs, and yet dissipates next to zero power. The power of the Capacitor would be classified in the "Dissipation Factor" which is less than 0.1% typical.

4. The Back to Back LEDs are connected to the parallel connected MOSFETs, one being an "N" channel and the other being a "P" channel. This is done so that both the negative side and the positive voltages of the incoming Line Voltage can be switched. The MOSFETs have a very low "ON" resistance making the Drain/Source voltage drop very low. Less than 100 mV is the typical ON voltage drop that calculates in to a 0.029 W Peak Power loss. This is an exceedingly low number, and makes it so that the vast majority of the Power Dissipation is in the LEDs themselves.

5. The MICRO PROCESSOR BASED MOSFET CONTROLLER (FIG. 17) reads the instantaneous line voltage from its on-board AID. The sequence of operation is:

A. The Dimmer is turned from OFF to some ON value. The Dimmer can be a potentiometer or two push button switches.
   B. The Micro Processor senses that the LEDs want to turn on.
   C. The Micro Processor looks at the LINE VOLTAGE DIVIDER and also the CAPACITOR VOLTAGE DIVIDER. If the voltages match within some small value that is hard coded, the Micro Processor turns on one of the MOSFETs. Initially, the CAP voltage would be Zero volts, so the MOSFET would be turned on at Zero volts.
   D. Depending on the setting of the Dimmer Control, the Micro Processor turns off the N Channel MOSFET, and stores the Line Voltage and the Capacitor Voltage in RAM. (As an example +40V is used).
   E. When the Live voltage has gone up to the +160v and is coming back down, the Micro Processor turns ON the N Channel MOSFET at +40V. Doing this makes it so that only a very small (or no) current transient will occur in the Capacitor/LED circuit.
   F. At the Zero Voltage Crossing point, the Micro Processor turns off the N channel MOSFET, and turns on the P Channel MOSFET. At −40V, the Micro Processor turns OFF the P Channel Micro Processor MOSFET and waits for it to go to −160V and then back to −40V. At −40V, the P Channel turns back on and stays on until Zero Cross.
   G. Return to 5 D, and repeat. Section 5 makes it so the Capacitor does not have Step Function changes in voltage which will cause very large current transients in the LEDs.

Referring back to FIG. 1, there is shown a simulated LED power supply circuit 10 to control blinking having typical AC voltage with capacitor 12 selected to provide the necessary current for the LEDs 14, 16. Addition of two diodes 20 and 26 with capacitors 22, 24 to circuit 10 as shown reduces or eliminates LED blinking. Capacitors 22 and 24 are filter capacitors. Diodes 20 and 26 and capacitors 22 and 24 are added to supply power to each LED during the half of the AC cycle where each LED would normally be turned off. Diode 20 allows capacitor 22 to charge during the half cycle that diode 16 is turned on, but does not allow the other half cycle to discharge capacitor 22. When capacitor 22 is charged enough to turn on diode, 16 it stays on throughout the AC cycle. The same relationship exists between diode 26, capacitor 24 and diode 14.

The larger the capacitors 22 and 24, the less variation there is in LED brightness, but the longer it takes for the LED to turn on initially. Filter capacitor in the circuit is large as (4000 uF) and 160 mS is needed to turn on.

Figure 2:
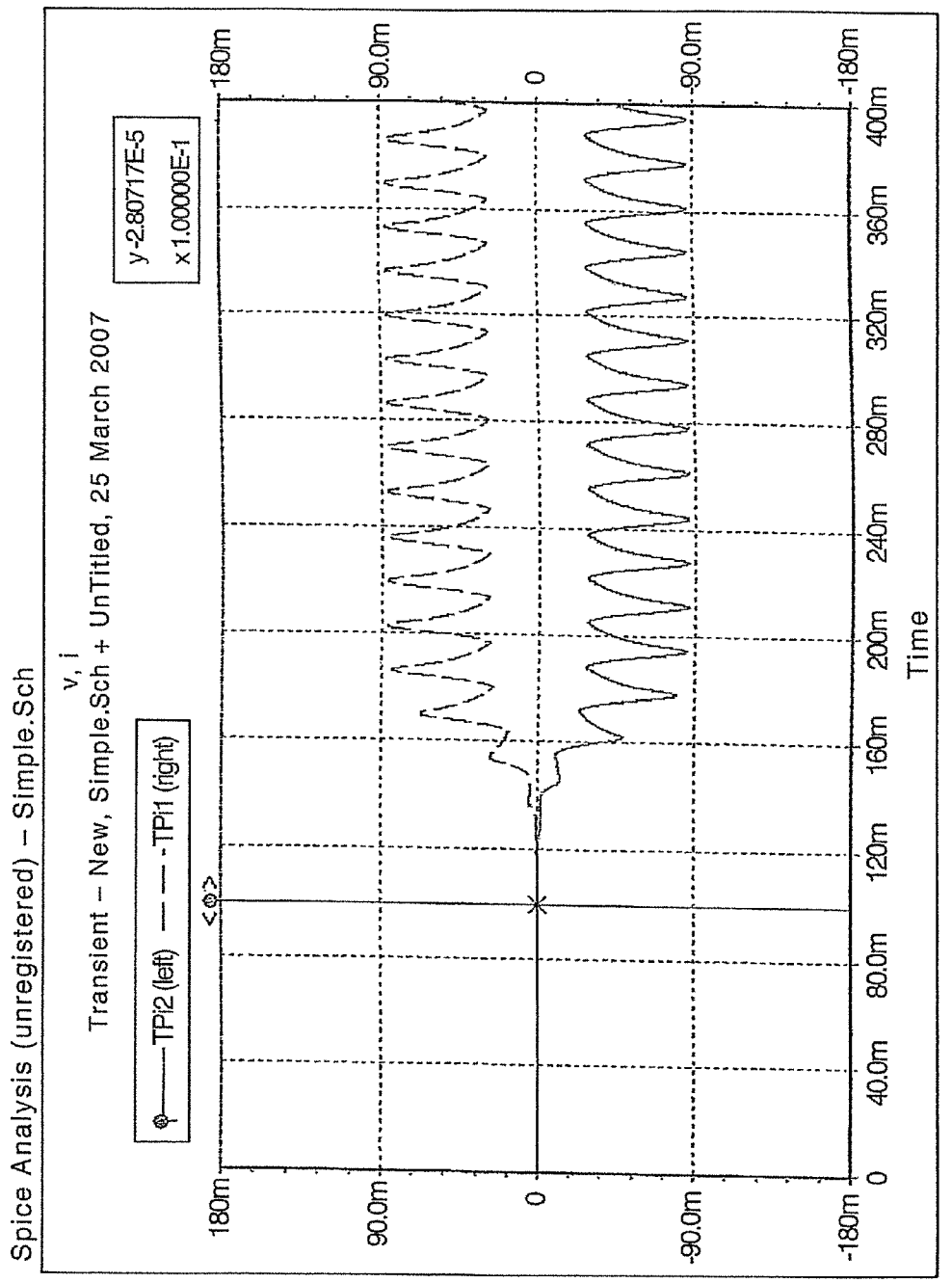
FIG. 2 illustrates LED current vs. time for the circuit of FIG. 1.
Figure 3:
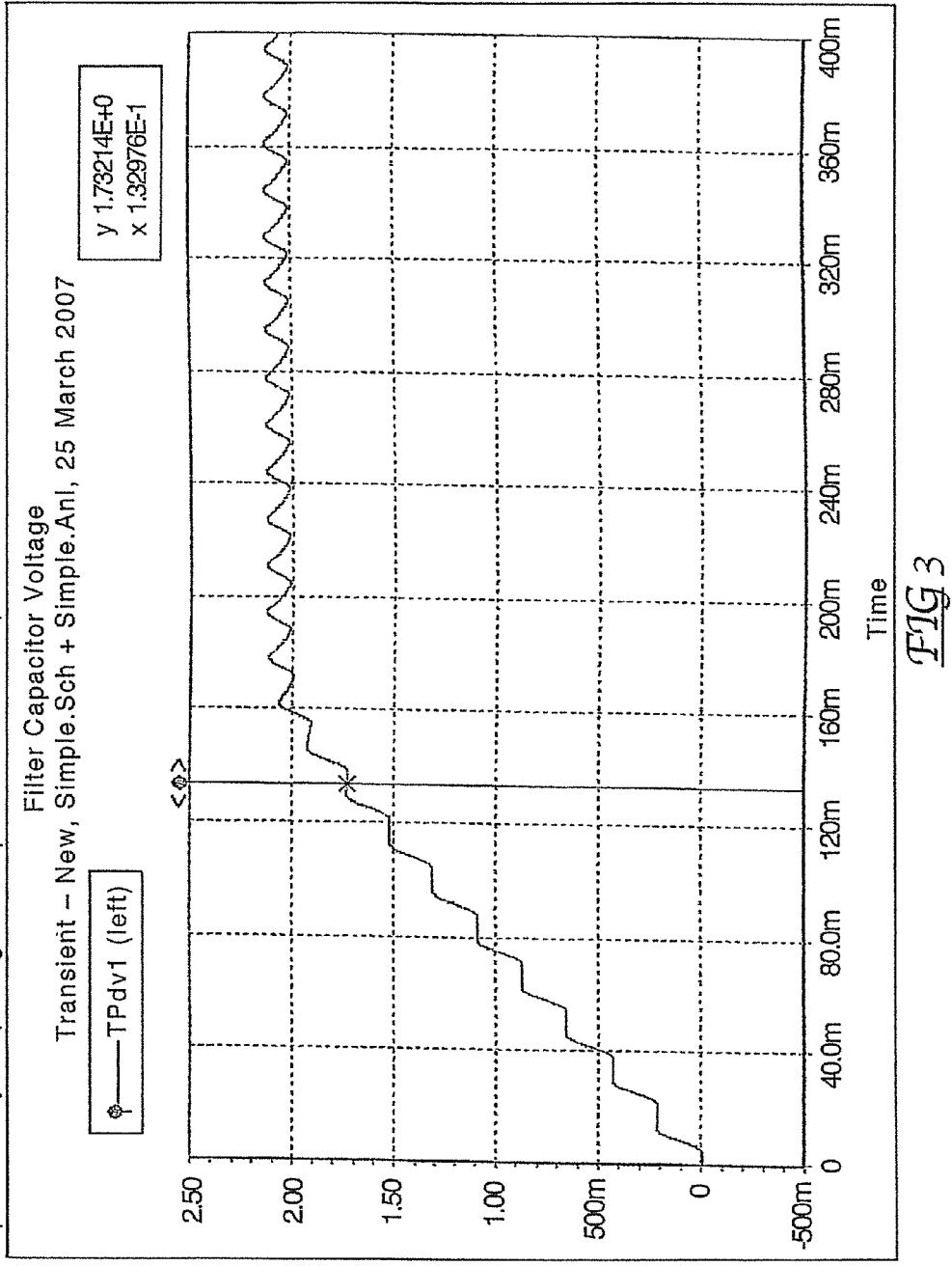
FIG. 3 illustrates voltage on one of the filter capacitors for the circuit of FIG. 1.
Figure 4:
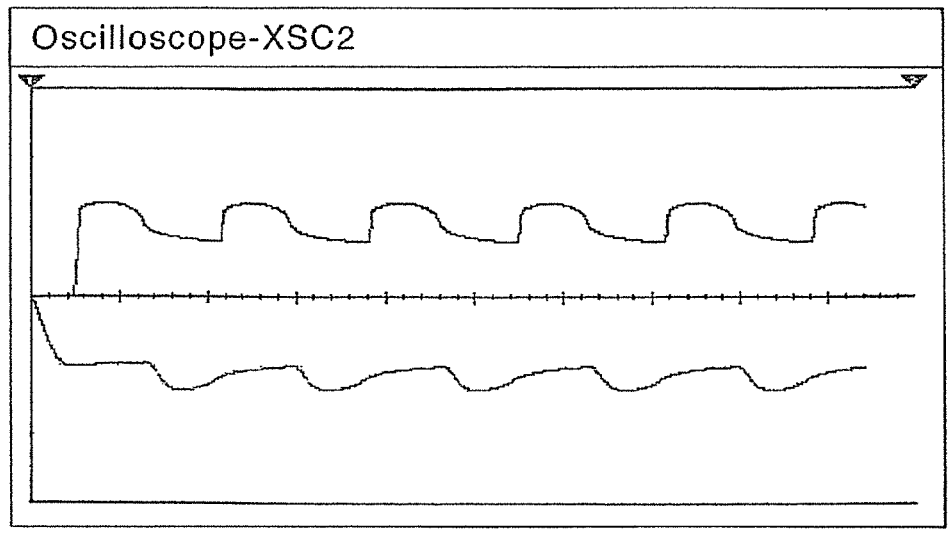
FIG. 4 illustrates voltage vs. time for capacitor C2 in the circuit of FIG. 1.
Figure 5:
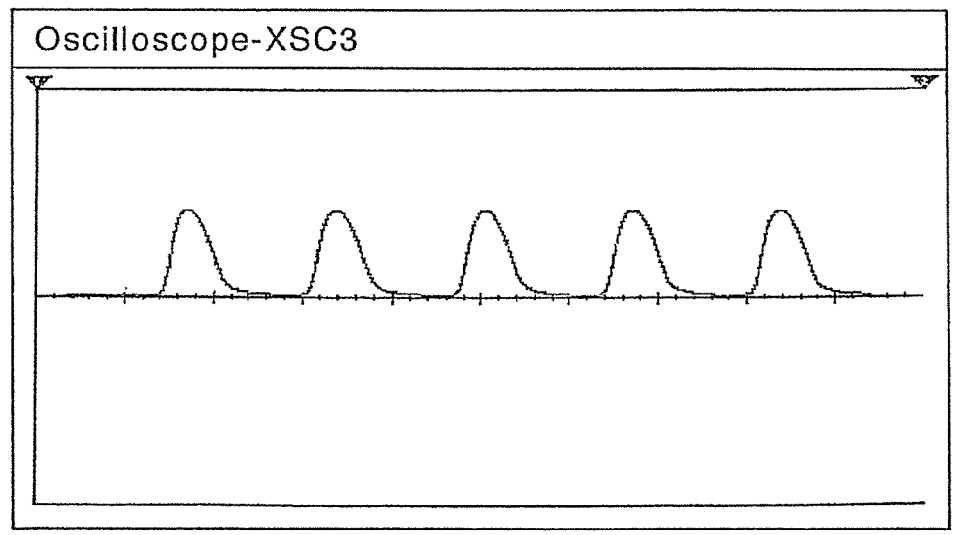
FIG. 5 illustrates voltage vs. time for capacitor C3 in the circuit of FIG. 1.
Figure 7:
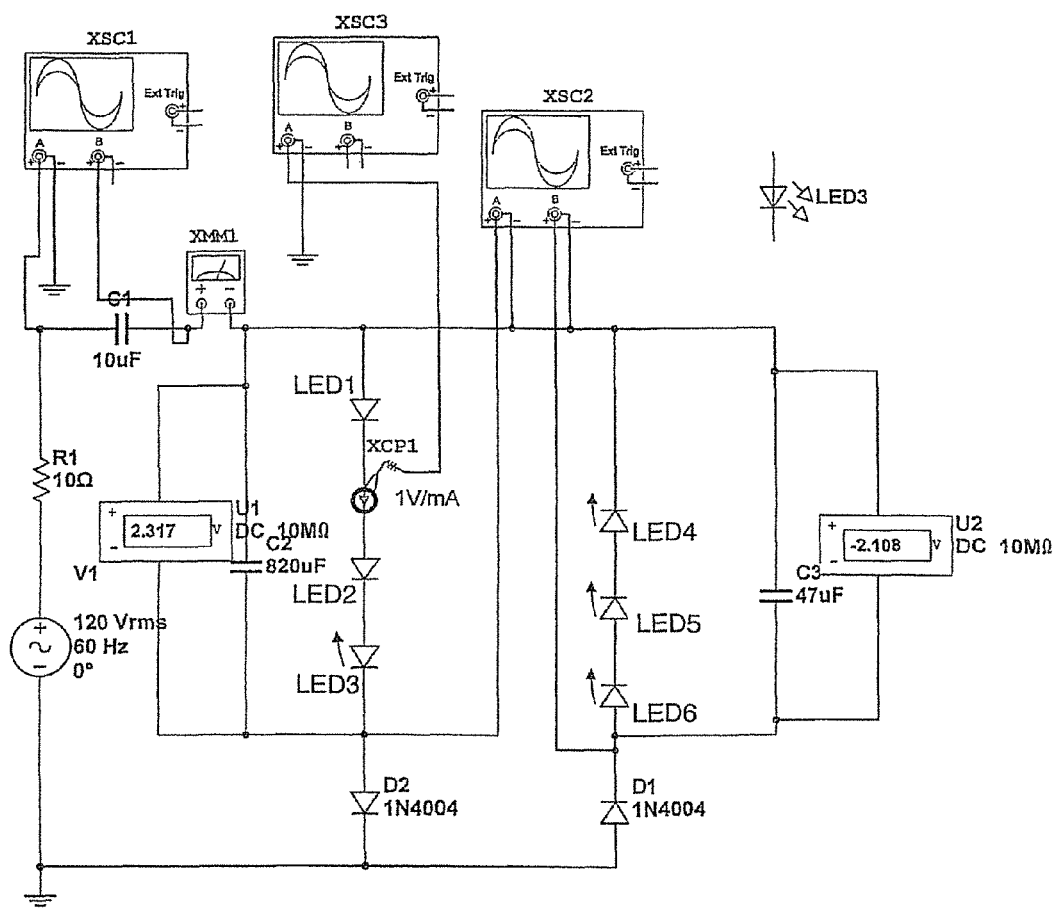
FIG. 7 illustrates the addition of multiple diodes for added LEDs in the circuit of FIG. 1.

Analysis results of circuit 10 of FIG. 1 are depicted in FIGS. 2-7. Current displays differently through each LED (FIG. 2). Voltage on one of the filter capacitors for circuit 10 is shown in FIG. 3. Voltage vs. time for capacitor 22 in the circuit 10 is shown in FIG. 4. FIG. 5 illustrates voltage vs. time for capacitor 24 in circuit 10 of FIG. 1. Voltage vs. time for capacitor 12 in circuit 10 is depicted in FIG. 6. Illustrated in FIG. 7 is addition of multiple diodes for added LED's in circuit 10 of FIG. 1.

Figure 8:
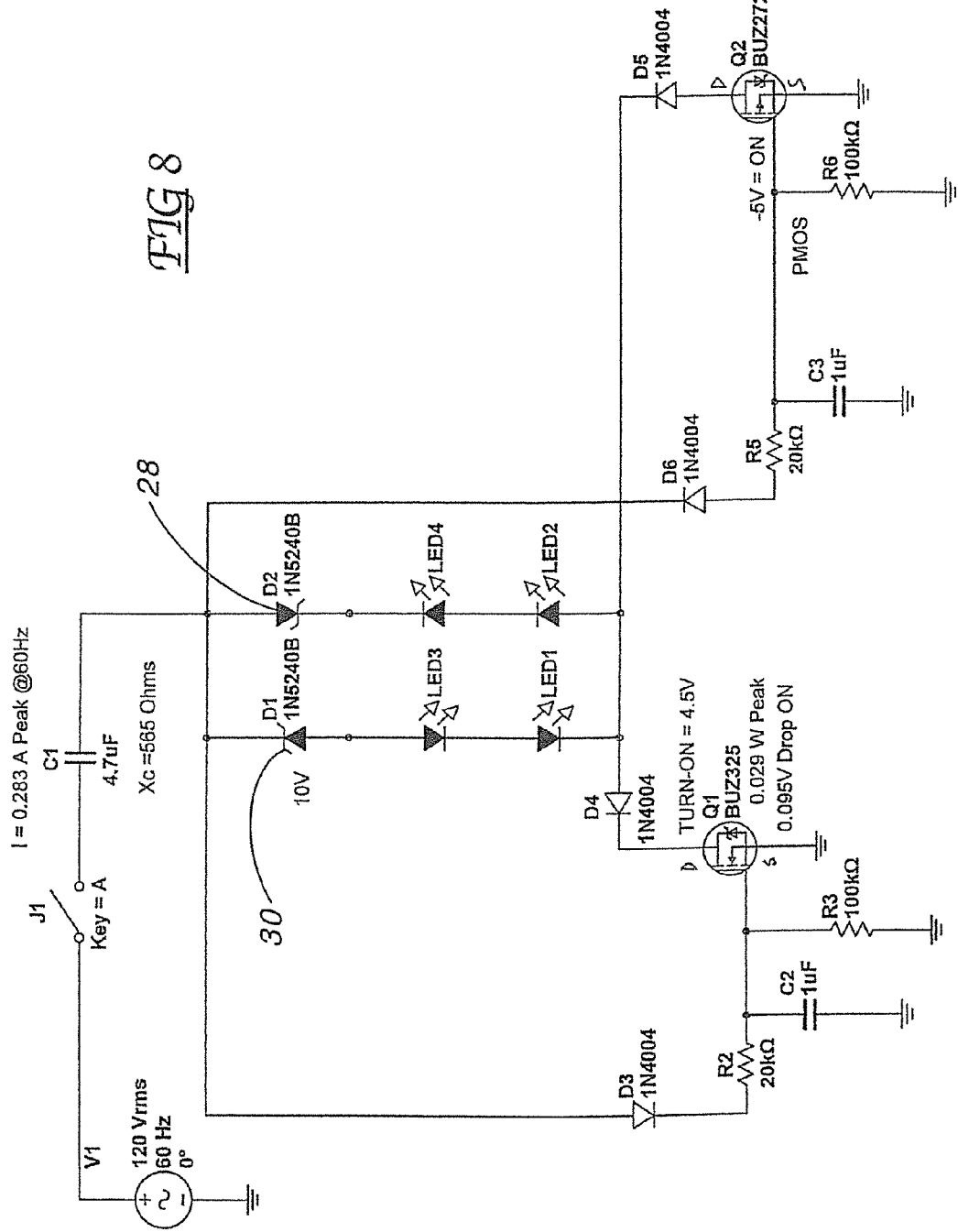
FIG. 8 illustrates a circuit with transistors (MOSFET) to reduce power consumption in the circuit.
Figure 9:
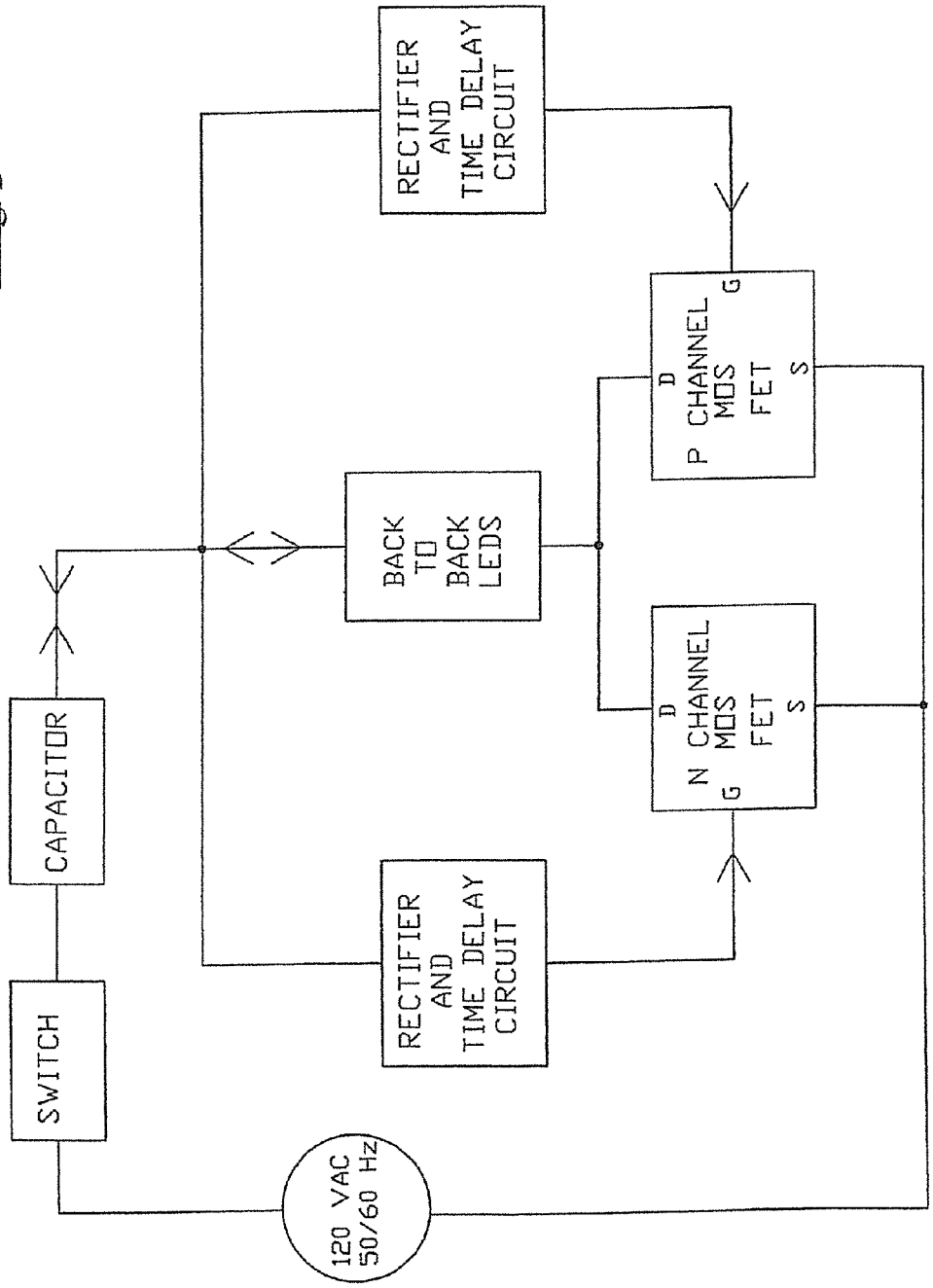
FIG. 9 illustrates a block diagram of the circuit in FIG. 8.

Now turning to FIG. 8, there is shown is circuit 10 employing transistors (MOSFET) to reduce power consumption in circuit 10. Circuit 10 of FIG. 8 is better shown in block diagram in FIG. 9.

Figure 10:
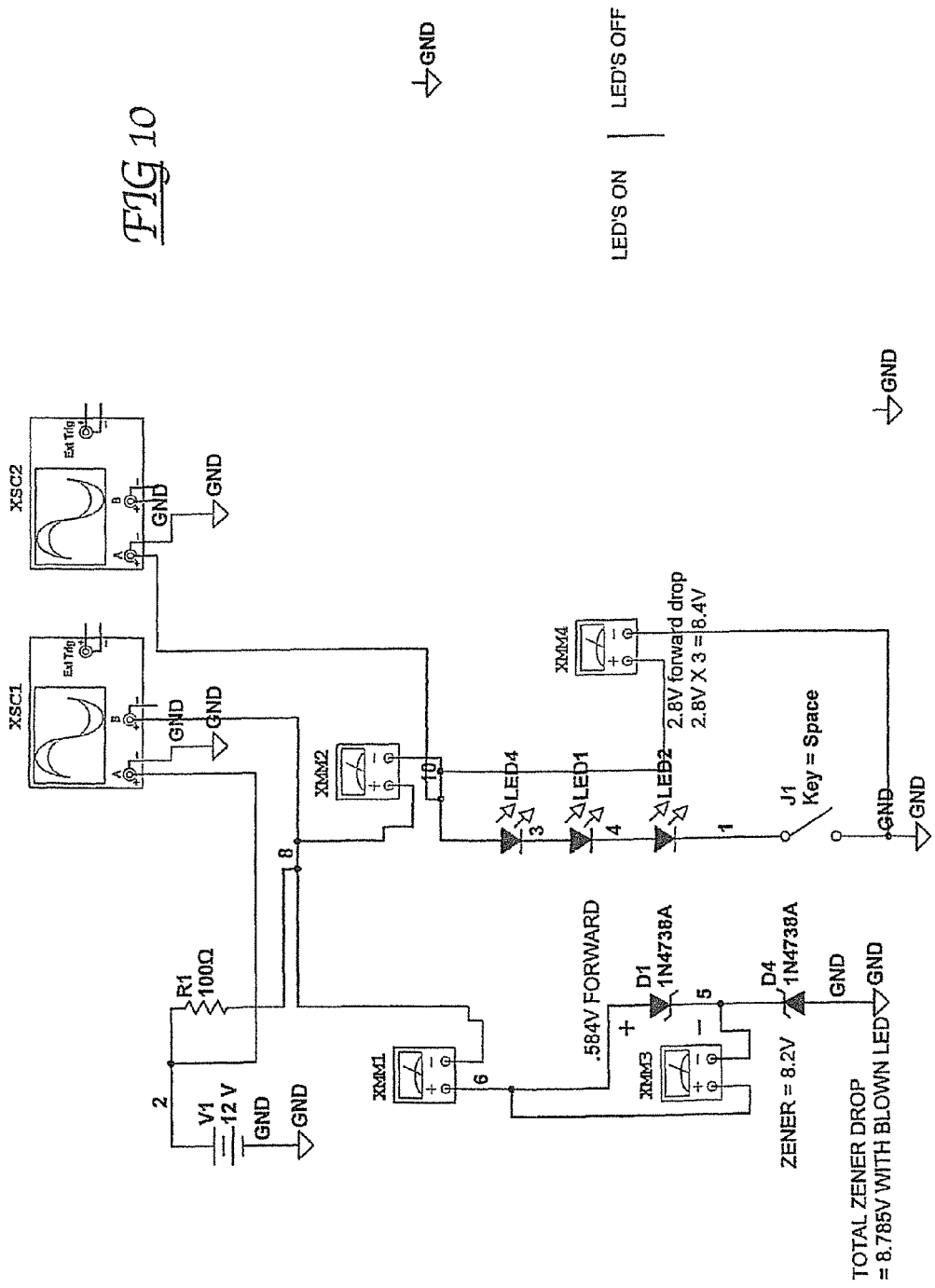
FIG. 10 illustrates a circuit with Zener diodes to protect circuit against LED failure or voltage spikes.
Figure 11:
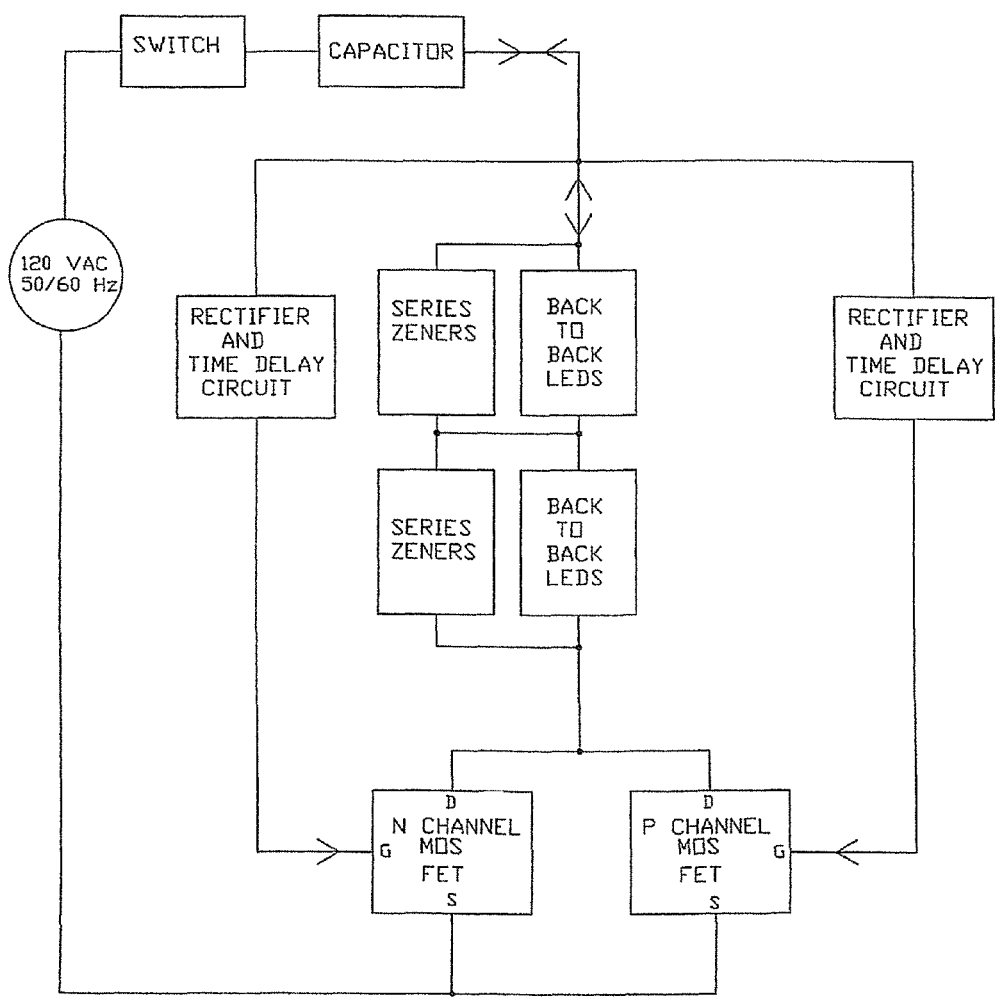
FIG. 11 illustrates a block diagram of a more sophisticated Zener protected circuit.
Figure 12A:
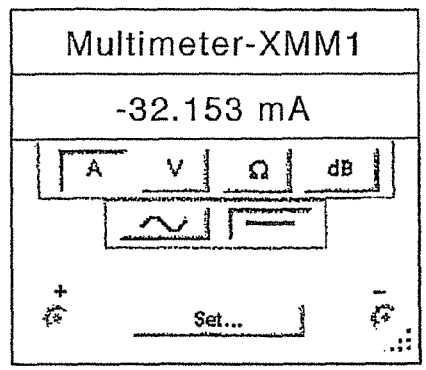
FIGS. 12a, 12b, 12c and 12d illustrate typical multi-meter readings for the circuit in FIG. 10.
Figure 12B:
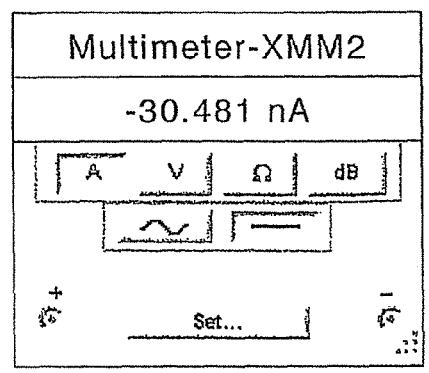
Figure 12C:
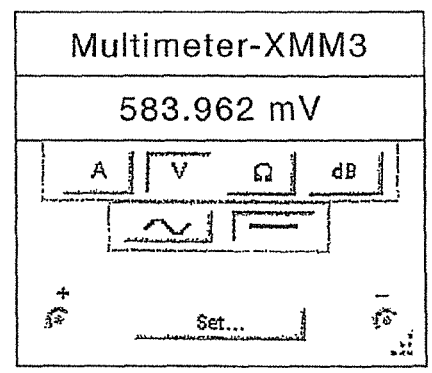
Figure 12D:
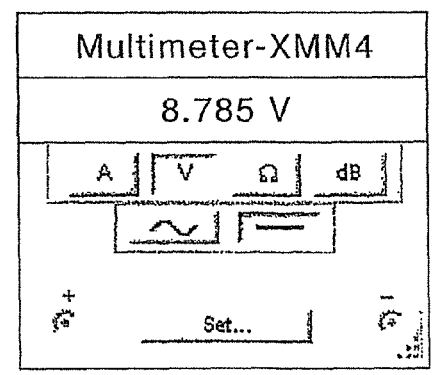
Figure 13:
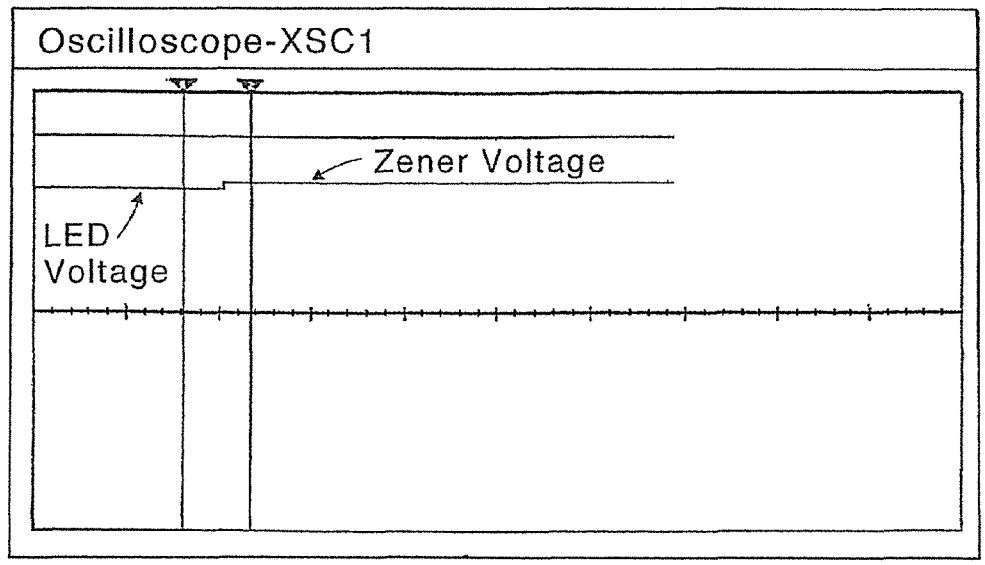
FIG. 13 illustrates the step in Zener voltage in the circuit of FIG. 10.
Figure 14:
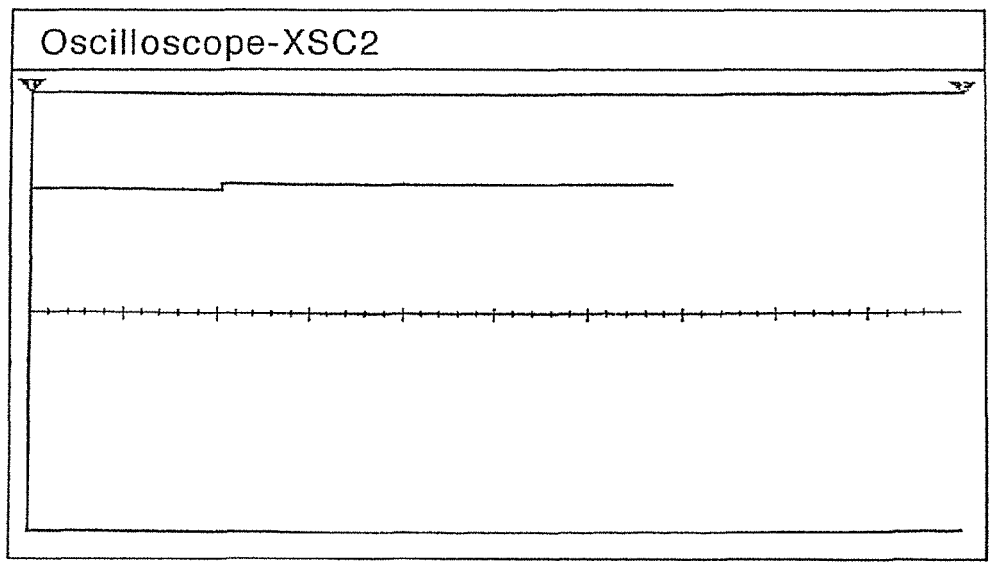
FIG. 14 illustrates the step in LED string voltage in the circuit of FIG. 10.
Figure 15A:
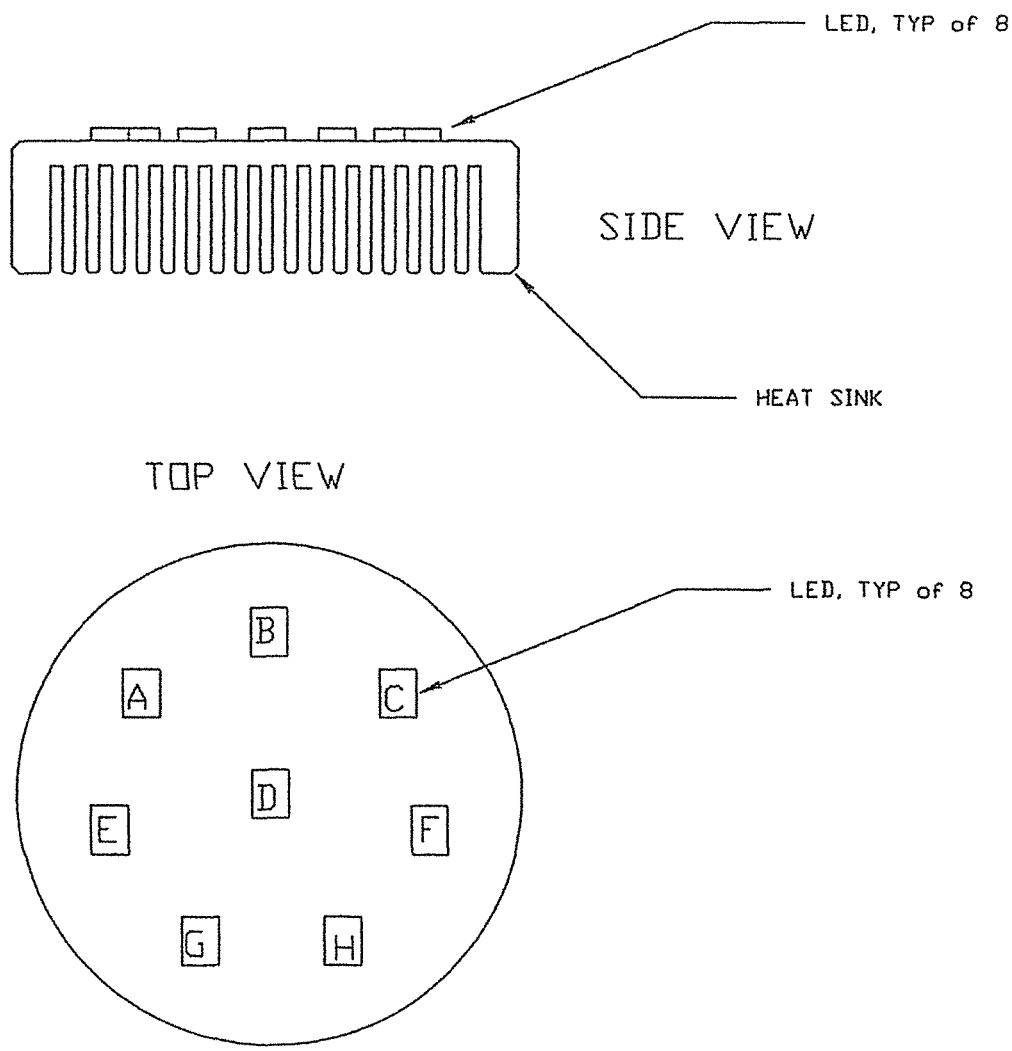
FIG. 15a illustrates the back of an 8 LED light array for general illumination.
Figure 15B:
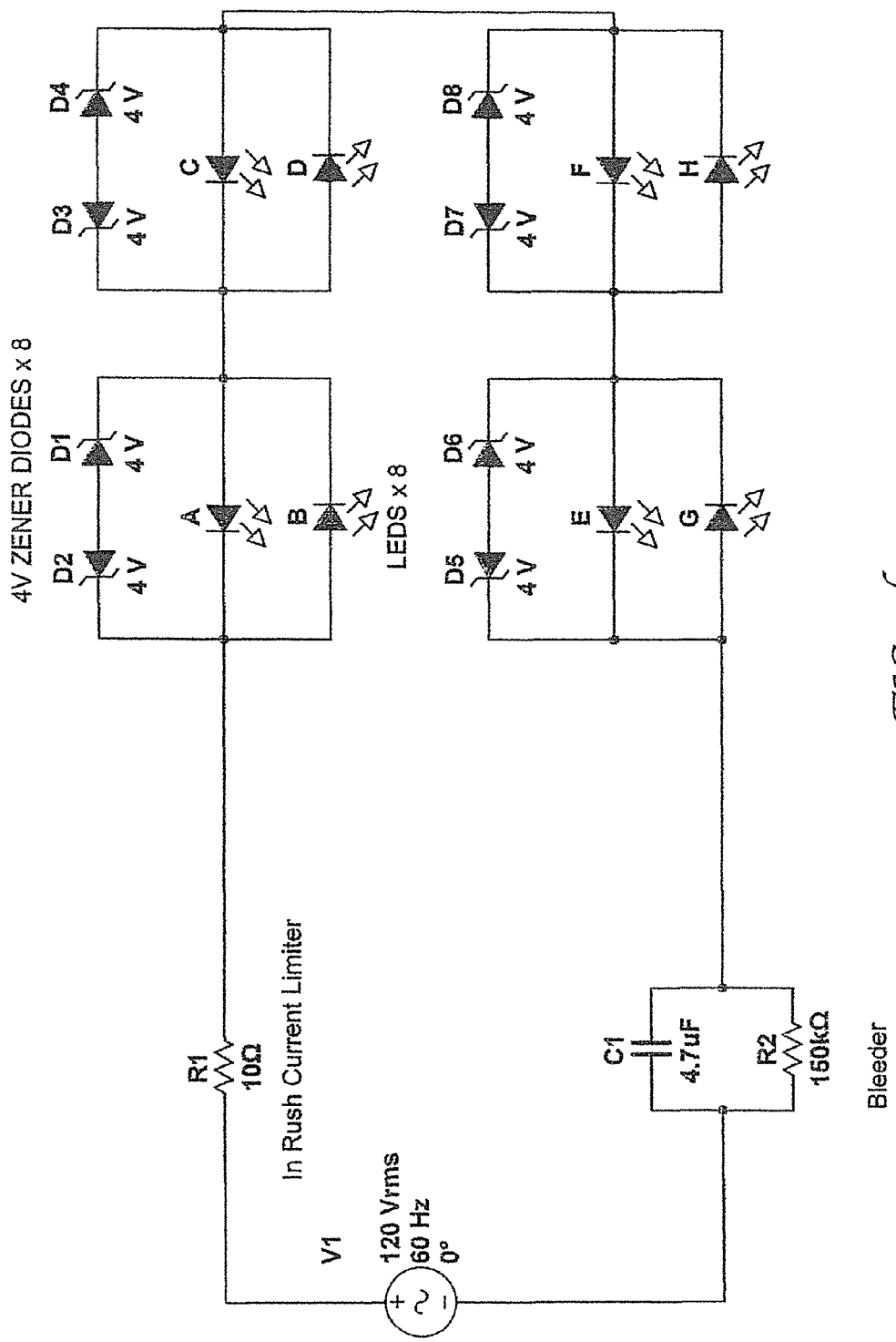

Circuit 10 using Zener diodes 28, 30 to protect against LED failure or voltage spikes is illustrated in FIG. 10, while FIG. 11 shows a more sophisticated Zener protected analog circuit 10 in block diagram. Elimination of power transient is shown in an analog circuit FIG. 11 and in a digital circuit FIG. 18. Typical multi-meter readings for points in the circuit of FIG. 10 are depicted in FIGS. 12a, b, 12c and 12d. Step in Zener voltage in circuit 10 of FIG. 10; is shown in FIG. 13 while FIG. 14 illustrates step in LED string voltage in circuit 10 of FIG. 10. Back of 8 LED light array for general illumination is illustrated in FIG. 15a. Zener circuit for light array of FIG. 15a is shown in FIG. 15b.

Figures 16A, 16B:
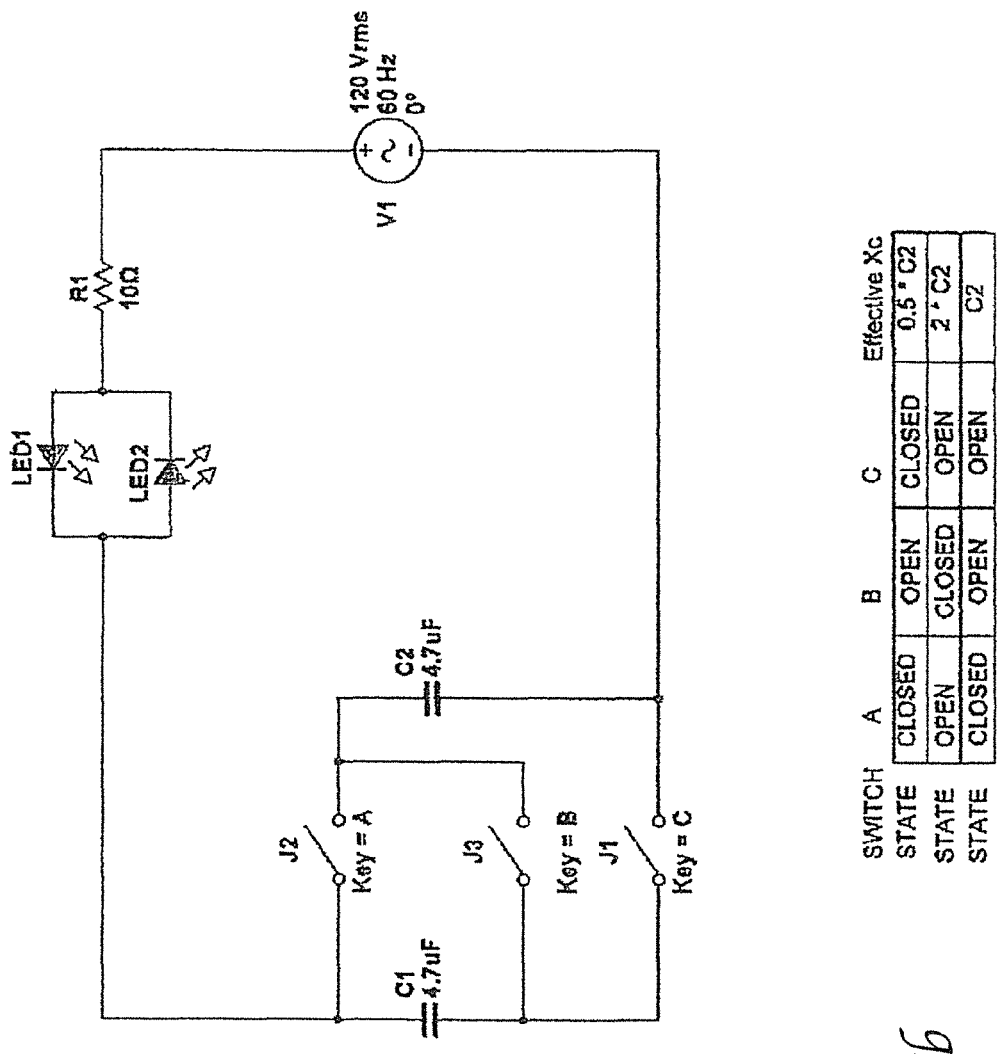

Simple circuit for a three-stage LED light dimmer circuit is shown in FIG. 16a. Truth table for LED light dimmer circuit of FIG. 16a is depicted in FIG. 16b.

Figure 18:
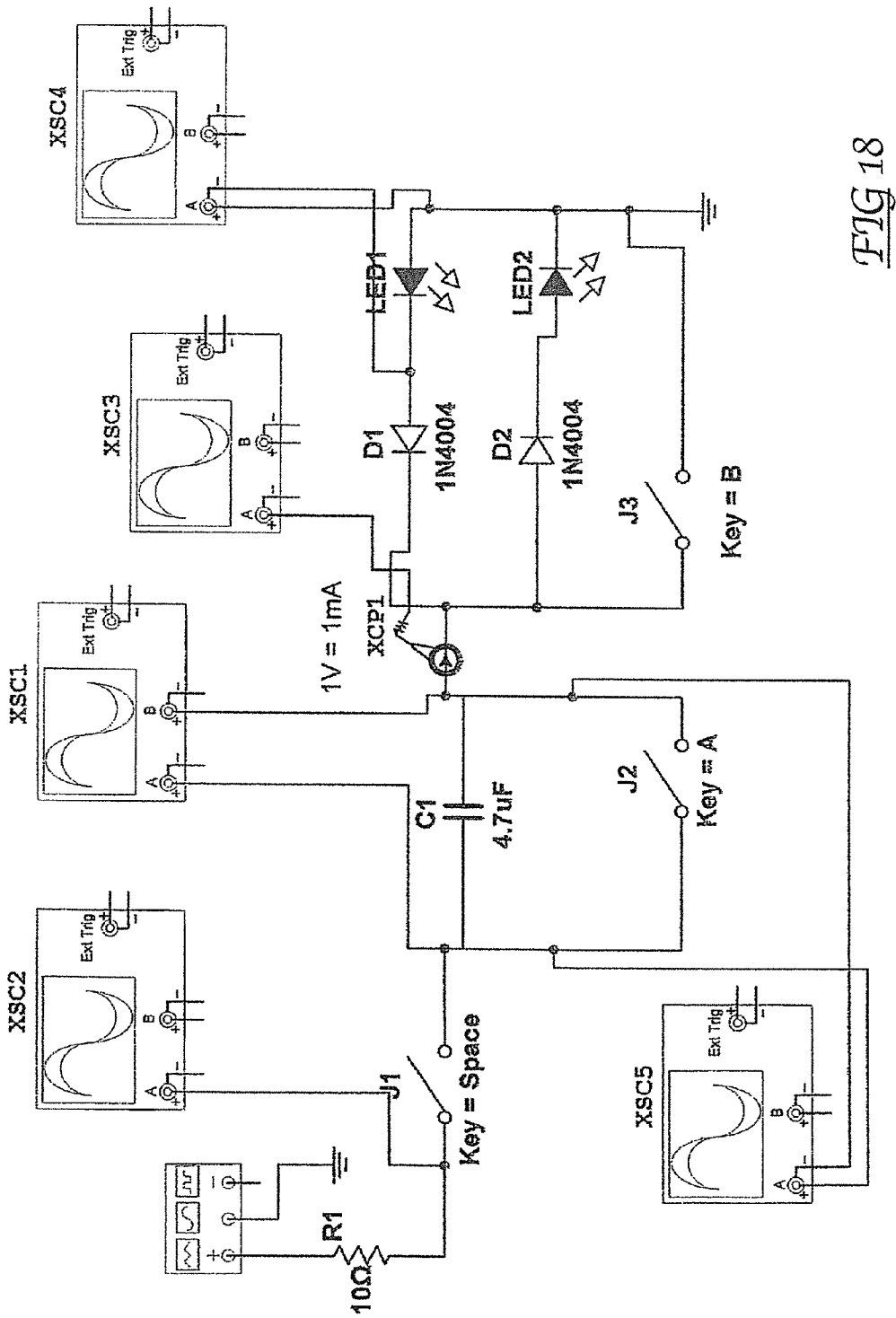
FIG. 18 illustrates a simulation circuit of invention of FIG. 17.

Substantially infinitely variable LED light dimmer is depicted in block diagram in FIG. 17. Circuit of FIG. 18 replicates block diagram of FIG. 17 for simulation purpose. Results of circuit of FIG. 18 are shown in graphs FIGS. 18a, 18b, 18c and 19 with power ON at zero cross, OFF at voltage X, ON at voltage X, OFF at voltage Y and ON at voltage Y.

Figure 18A:
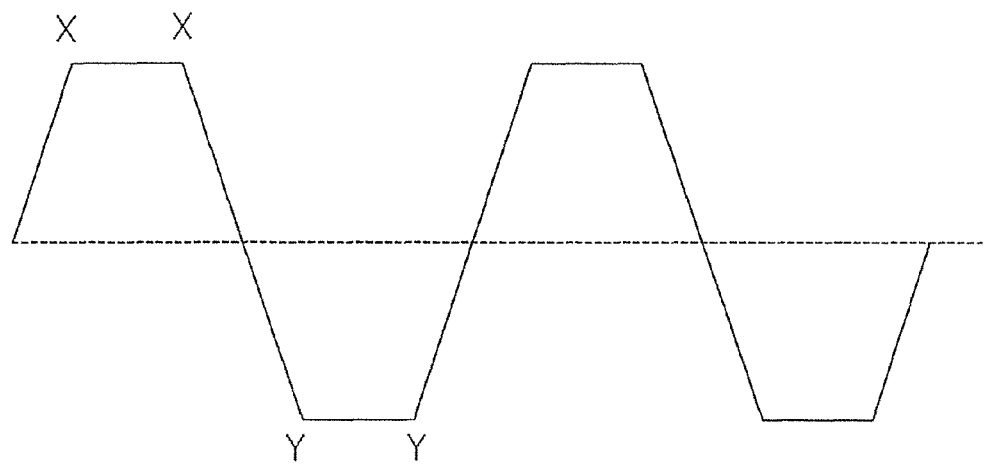
FIG. 18a illustrates a graph of capacitor voltage for the light dimmer of FIG. 17.
Figure 18B:
FIG. 18b illustrates a graph of capacitor plus LED voltage for the light dimmer of FIG. 17.
Figure 18C:
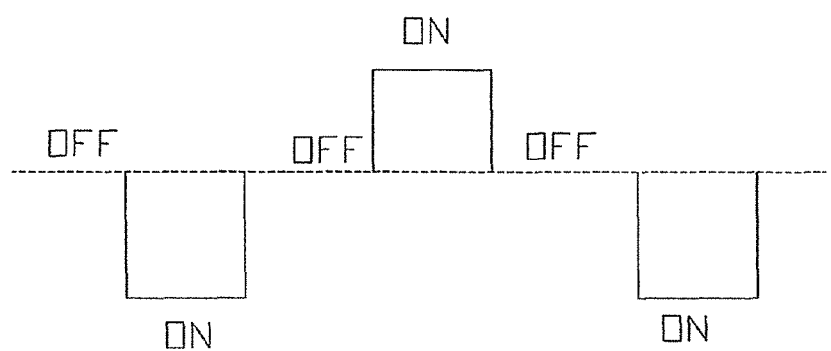
FIG. 18c illustrates a graph of capacitor plus LED current for the light dimmer of FIG. 17.

Capacitor voltage for the light dimmer of FIG. 17 is depicted in graph FIG. 18a. Capacitor plus LED voltage for the light dimmer of FIG. 17 is shown in graph FIG. 18b. Capacitor plus LED current for the light dimmer of FIG. 17 is depicted in FIG. 18c.

Figure 19:
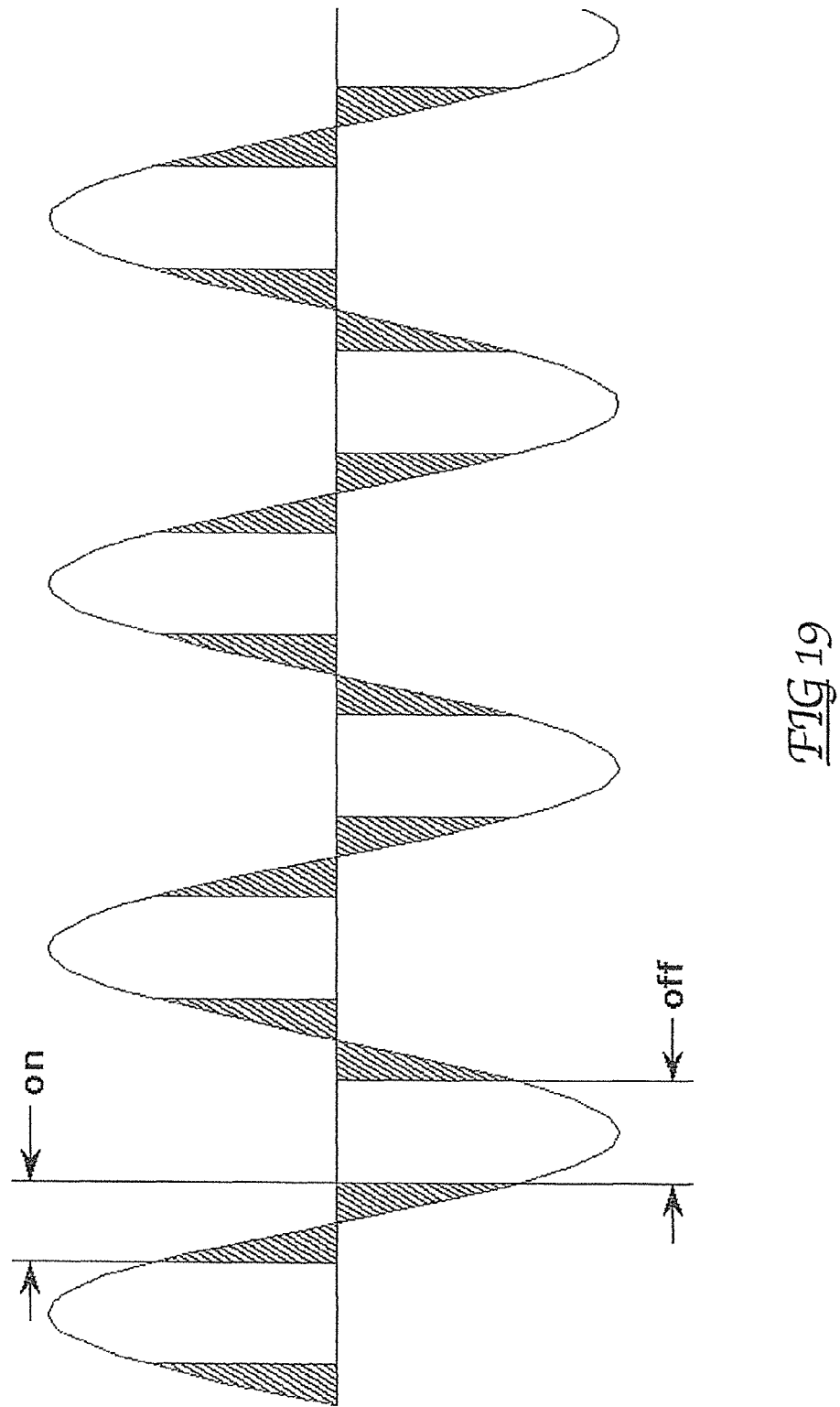
FIG. 19 illustrates a graph of the on and off portions of the sinusoidal input for the dimmer of FIG. 17.

On and off portions of the sinusoidal input for the dimmer of FIG. 17 are shown in the graph of FIG. 19 using MOSFETs.

Achieving Constant Light Output over a Wide Range of Line Voltages

The LED dimmer shown in FIG. 17 can produce a light output that is constant over a wide range of line voltages. The algorithm controlling the dimmer has the goal of charging the capacitor up to a specific voltage (dependent on dimmer setting) during the positive half cycle and down to the negative of that voltage during the negative half cycle. Here "positive half cycle" means the half cycle where current could flow through the positive LEDs if the n-channel MOSFET is turned on. This is the part of the line voltage curve where dV/dt is positive, and extends from the negative peak voltage to the positive peak voltage. "Negative half cycle" is the part of the curve where dV/dt is negative. See FIG. 19 wherein the area labeled ON is part of the negative half cycle.

We begin with the relation:

$$L(t)=k*|I(t)|$$

where L(t) is the light output at time t, k is some constant dependent on the specific LED, and I(t) is the current at time t. Absolute value is used since current in either direction produces positive light from the back-to-back LEDs. The total light output for a half cycle is then:

$$\int L(t)dt = k\int I(t)dt = kC\int \frac{dV}{dt}dt = kC\int dV$$

This is using the formula for current through a capacitor given by:

$$C\,dV/dt = I(t)$$

Integrating kC∫dV from V1 to V2 gives the total light output=kC(V2−V1).

Thus, it can be seen that the total light output depends only on beginning and ending voltage on the capacitor. When the user enters a brightness setting S (from 0 to 100), the algorithm chooses a target voltage Vtarg=S(VP117−VLED)/100 where VP117 is the peak voltage at 117V RMS and VLED is the On voltage of the LED string. V P117=117√2=165.5V.

If, for example, there are 4 LEDs in series in each direction, then VLED=4*4=16V, and Vtarg=(165.5−16)*S/100=1.5*S.

Suppose the dimmer is set to S=80. Then target voltage Vtarg=120V, and the algorithm will try to charge the capacitor to 120V on the positive half cycle and to −120V on the negative half cycle. As long as the peak line voltage V peak≥Vtarg+V LED=136V, it will be able to hit the target voltage and the light output will be constant. This means that the line voltage can drop to 136/√2=96V RMS before the light starts to dim.

The line voltage can rise to any reasonable level that does not result in catastrophic failure and the light output will not change. This feature can be incorporated into a useful device in several different ways:

1. As a single brownout-proof light bulb, if the circuit of FIG. 17 is used without the dimmer control knob. In this case the "dimmer" would be permanently set to a value less than 100% brightness to provide brownout protection. For example, if one wanted a brightness equivalent to a 100 W incandescent bulb, the circuit would be designed so that 100% brightness would be equivalent to a 125 W bulb and permanently set the dimming to 80%. Then Vtarg=(165.5−16)*0.8=120V. As long as the peak line voltage is above Vtarg+VLED=136 (or RMS line voltage is above 136/√2=96V), the light will stay constant regardless of fluctuations in line voltage.

Figure 20:
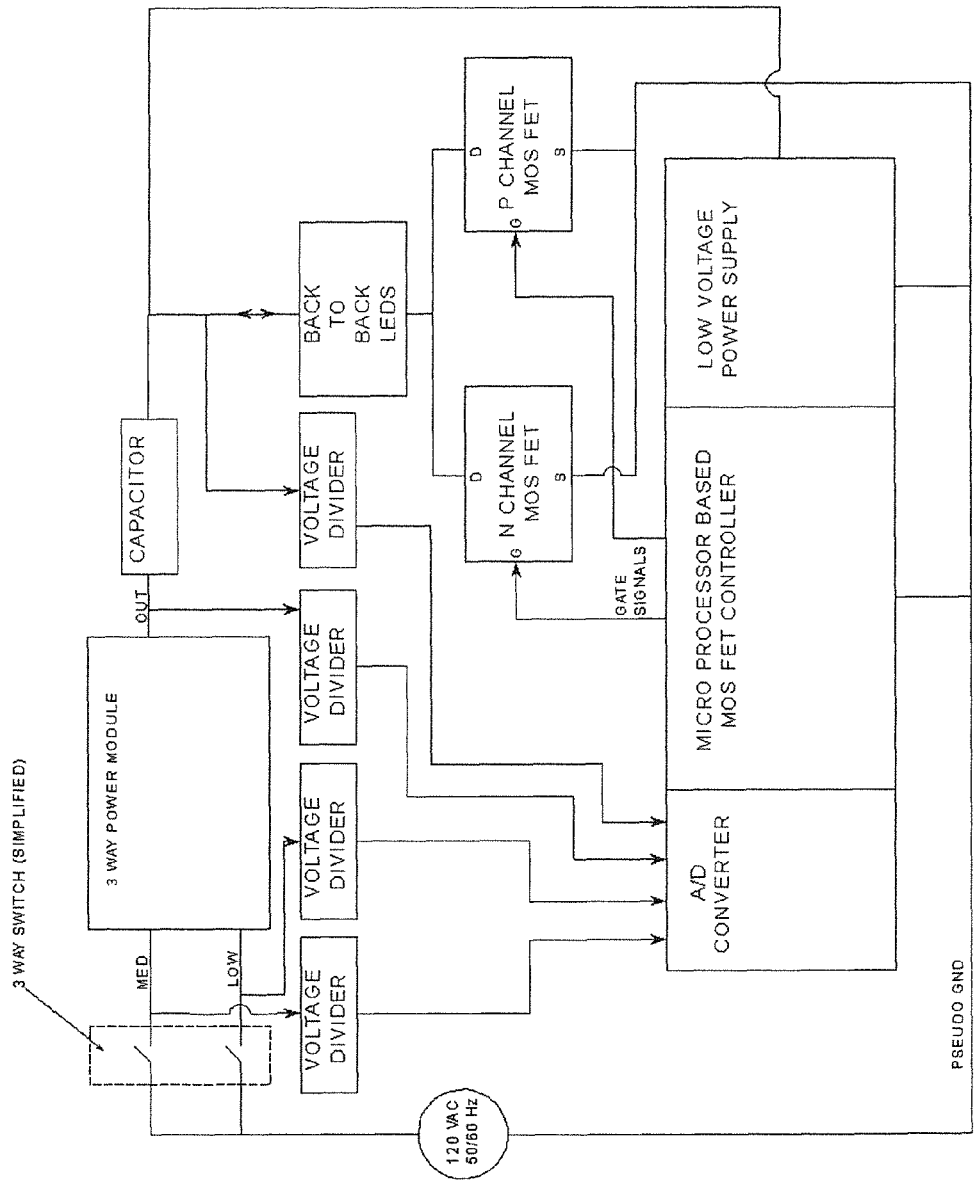
FIG. 20 is a block diagram illustrating a 3-way LED system according to the invention.
Figure 21:
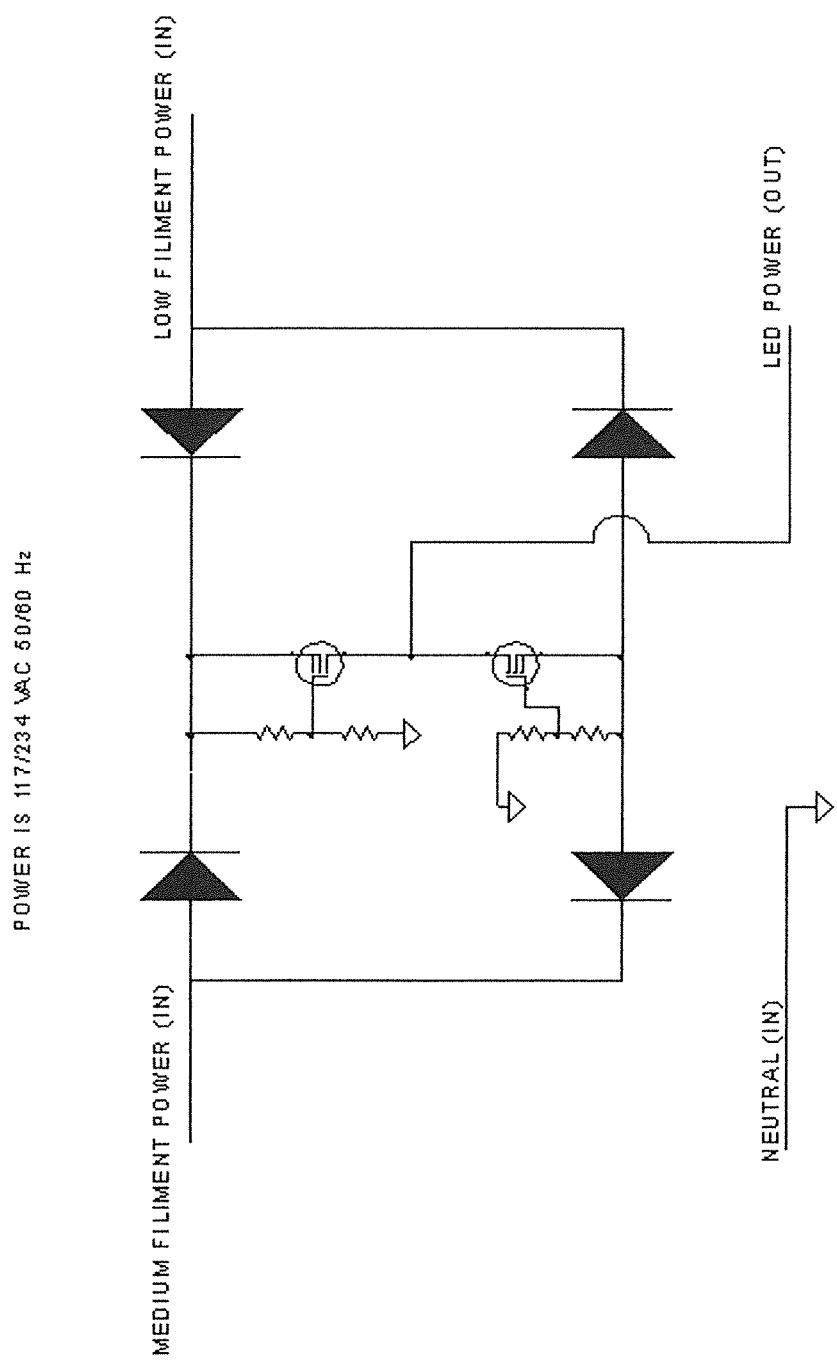
FIG. 21 is a detail schematic of a 3-way power module.

2. As a brownout-proof 3-way bulb replacement packaged as a standard 3-way bulb. Incandescent 3-way bulbs have 2 filaments, either of which or both can be powered to provide 3 levels of light. There are 3 electrical connections, neutral plus one power connection for each filament. Again, in this case the circuit in FIG. 17 is used without the dimmer control knob. The electronics and the LEDs can be powered from the power line for either filament. As in (1), the bulb is designed to always run with brightness less than 100% so that there is brownout-protection at the brightest setting. FIG. 20 is a block diagram illustrating a 3-way LED system according to the invention, and FIG. 21 is a detail schematic of a 3-way power module.

3. As a brownout-proof light with dimmer. In this case, the circuit of FIG. 17 would be used with the dimmer control knob. The maximum brightness is again set to a value less than 100% in order to provide brownout protection at the brightest setting. Here "brownout-proof" and "brownout-protection" also means constant light output when the line voltage surges above the normal level. In other words the circuit is "line voltage insensitive."

Improvements to Reduce Blinking

The voltage change on the capacitor in FIG. 17, in one half cycle, is proportional to the total light output of the LEDs during that half cycle. It is important that the voltage change be the same on every half cycle; otherwise the variation could be perceived as blinking. At 117V RMS, the instantaneous line voltage is V(t)=165 sin(2π60t) so dV/dt=165*120π cos(2π60t). The maximum dV/dt occurs when cos( )1, so the maximum dV/dt=62,204 V/sec.

Many low-power microprocessors can only sample at a fairly slow rate. As such, there may be a fairly large voltage difference on the capacitor from one cycle to the next. For example, if the microprocessor is capable of sampling at a rate of 20,000 times/sec then an error equal to one sample time gives a voltage error of (62,204 V/sec)/(20,000 samples/sec)=3.1 V/sample. If there are 4 LEDs in series, the voltage drop across them is about 16V, so the peak charge on the capacitor is 165−16=149V. The light variation due to sample timing error at 90% brightness is 3.1*100/(149*0.9)=2.3%. At 10% brightness, it is 21%.

Figure 22:
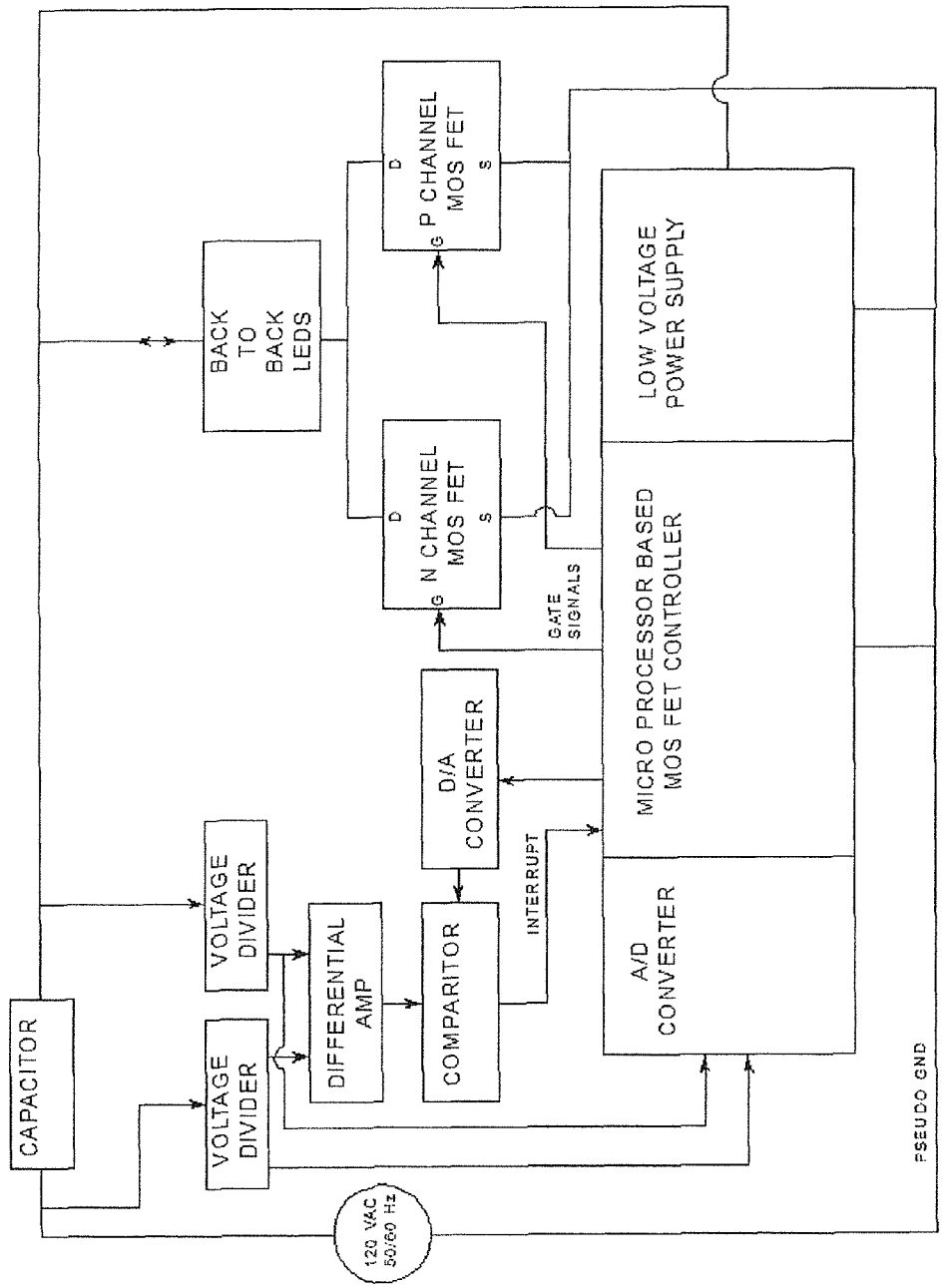
FIG. 22 is a schematic of an alternative embodiment of the invention with reduced blinking.

The circuit shown in FIG. 22 is designed to automatically detect when the voltage across the capacitor has reached a predetermined value, and interrupt the processor when this occurs. The processor should be able to respond to the interrupt in a few microseconds, thus reducing the flicker due to timing error to a nearly negligible level. For example, if the micro can respond to the interrupt in 5 uS, the error will be 62,204 V/sec*5*10^−6 sec=0.31 V which is only 0.23% at 90% brightness and 2.1% at 10% brightness.

When zero cross is detected at the LED side of the capacitor, the microprocessor turns on the N channel or P channel MOSFET, depending on whether this is the start of the positive half cycle or the negative half cycle. The micro then calculates the desired final voltage on the capacitor and programs the D/A converter to match that voltage. A voltage proportional to the voltage across the capacitor is produced by the differential amp shown in FIG. 22. When this voltage reaches the same voltage as the D/A, the comparator generates an interrupt to the microprocessor. The microprocessor then turns off the MOSFET and waits for zero cross again.

Some microprocessors contain a D/A and a comparator on the same chip. If so, these can be used instead of external hardware. Some microprocessors have a feature in their A/D converter where they can continually convert an analog signal to digital and compare the result to a digital word and interrupt the processor when the result is greater (or less) than that word. If the A/D is fast enough, this could also be used to eliminate the D/A and comparator.

Having described the invention, many modifications thereto will become apparent to those skilled in the art to which it pertains without deviation from the spirit of the invention as defined in the appended claims.

The invention claimed is:

1. Electrical apparatus for controlling back-to-back light-emitting diodes (LEDs) powered by an alternating current (AC) line voltage, the apparatus comprising:
   a pair of electrically controlled switches connected in parallel with one another, and with the switches in parallel being connected in series with the LEDs;
   a voltage divider outputting a signal representative of the AC line voltage;
   an electrical component having a value providing a signal that determines the brightness of the LEDs through a range of brightness levels up to a maximum brightness level;
   a control circuit in electrical communication with the voltage divider, the electrically controlled switches, and the electrical component, the control circuit being operative to independently control the electrically controlled switches to adjust the brightness level of the LEDs as a function of the signals received from the voltage divider and the electrical component; and
   wherein the value of the electrical component is intentionally selected to produce an LED brightness level below the maximum brightness level, such that the light produced by the LEDs is substantially constant over a wide range of AC line voltages.

2. The apparatus of claim 1, wherein:
   the electrical component is a resistance; and
   the electrical signal that determines the brightness of the LEDs is a voltage.

3. The apparatus of claim 1, wherein two values of the electrical component are selected to simulate the operation of a conventional 3-way incandescent light bulb.

4. The apparatus of claim 1, wherein:
   the electrical component is a variable resistance; and
   the variable resistance is set a position to produce an LED brightness level that is less than the maximum brightness level.

5. Electrical apparatus for controlling light-emitting diodes (LEDs) powered by an alternating current (AC) line with positive and negative half cycles occurring at alternating zero-crossing points, the apparatus comprising:
   at least one set of LEDs connected in a back-to-back configuration;
   a dimmer control enabling a user to adjust the light produced by the LEDs to a desired brightness level;
   a pair of electrically controlled switches connected in parallel with one another, and with the switches in parallel being connected in series with the LEDs;
   a capacitor supplying power to the LEDs, the capacitor, the LEDs, and the switches being connected in series with the AC line;
   a processor being operative to turn ON one of the electrically controlled switches and a subset of the LEDs for each half cycle of the AC line when each zero crossing point is detected;
   a differential amplifier outputting a signal representative of the instantaneous voltage across the capacitor following each zero-crossing point;
   the processor being further operative to determine a maximum voltage value across the capacitor associated with the desired brightness level set by the user control; and
   a comparator operative to compare the instantaneous voltage across the capacitor and the maximum voltage value across the capacitor and interrupt the processor causing the processor to turn OFF the electrically controlled switch and the subset of LEDs until the following half cycle to reduce blinking.

6. Electrical apparatus for controlling light-emitting diodes (LEDs) powered by an alternating current (AC) line with positive and negative half cycles occurring at alternating zero-crossing points, the apparatus comprising:
   at least one set of LEDs connected in a back-to-back configuration;
   a dimmer control enabling a user to adjust the light produced by the LEDs to a desired brightness level;
   an n-channel MOSFET and a p-channel MOSFET connected in parallel with one another, and with the MOSFETs in parallel being connected in series with the LEDs;
   a capacitor supplying power to the LEDs, the capacitor, the LEDs, and the MOSFETs being connected in series with the AC line;
   a processor being operative to:
   a) turn ON the n-channel MOSFET and a subset of the LEDs for each positive half cycle of the AC line when each zero crossing point is detected prior to the onset of each positive half cycle, and
   b) turn ON the p-channel MOSFET and a different subset of the LEDs for each negative half cycle of the AC line when each zero crossing point is detected prior to the onset of each negative half cycle;
   a differential amplifier outputting a signal representative of the instantaneous voltage across the capacitor following each zero-crossing point;
   the processor being further operative to determine a maximum voltage value across the capacitor associated with the desired brightness level set by the user control; and
   a comparator operative to compare the instantaneous voltage across the capacitor and the maximum voltage value across the capacitor and interrupt the processor causing the processor to turn OFF each MOSFET and the subset of LEDs controlled by each MOSFET until the following half cycle to reduce blinking.

* * * * *